US006191859B1

(12) United States Patent
Winterbottom et al.

(10) Patent No.: US 6,191,859 B1
(45) Date of Patent: *Feb. 20, 2001

(54) OPTICAL SYSTEMS FOR USE IN SORTING APPARATUS

(75) Inventors: David Roy Winterbottom, Colchester; Laurence John Robinson, Litlington, both of (GB)

(73) Assignee: Sortex Limited, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/739,006

(22) Filed: Oct. 28, 1996

(51) Int. Cl.[7] ........ G01J 3/51

(52) U.S. Cl. ........ 356/406; 356/407; 356/419; 250/226; 209/580

(58) Field of Search ........ 356/402, 405, 356/406, 407, 416, 419; 250/226; 209/577, 580–582

(56) References Cited

U.S. PATENT DOCUMENTS

| | | | |
|---|---|---|---|
| 1,926,824 | 9/1933 | Stogoff . | |
| 3,603,458 | 9/1971 | Bliss . | |
| 4,203,522 | 5/1980 | Fraenkel et al. | 209/558 |
| 4,330,062 * | 5/1982 | Conway et al. | 356/407 |
| 4,513,868 | 4/1985 | Culling et al. | 209/581 |
| 4,630,736 | 12/1986 | Maughan et al. | 209/587 |
| 4,699,273 | 10/1987 | Suggi-Liverani et al. | 209/580 |
| 5,120,126 | 6/1992 | Wertz et al. | 356/71 |
| 5,315,384 | 5/1994 | Heffington et al. | 356/237 |
| 5,508,512 | 4/1996 | Gray et al. | 250/226 |
| 5,538,142 | 7/1996 | Davis et al. | 209/580 |

FOREIGN PATENT DOCUMENTS

| | | |
|---|---|---|
| 0247016B1 | 12/1991 | (EP) . |
| 0566397A2 | 10/1993 | (EP) . |
| 0719598A2 | 7/1996 | (EP) . |
| WO9614168 | 5/1996 | (WO) . |

* cited by examiner

*Primary Examiner*—F. L. Evans
(74) *Attorney, Agent, or Firm*—Skjerven Morrill MacPherson LLP

(57) ABSTRACT

An optical system is disclosed for use in sorting apparatus to monitor light at a viewing station thereof to generate signals indicative of the optical properties of selected items in the product stream being sorted. In the system light received from a single line at the viewing station is split into discrete beams, which are filtered into different wavelength ranges to determine the category of the respective product items. The beams are directed onto a slit through which the light beams must pass on their way to respective lines of light sensors.

27 Claims, 2 Drawing Sheets

OPTICAL SYSTEMS FOR USE IN SORTING APPARATUS

BACKGROUND TO THE INVENTION

This invention relates to sorting apparatus. It is particularly concerned with such apparatus which grades product according to colour characteristics, and activates an ejection mechanism based on that grading to remove selected product from the stream. The present invention is directed at an optical system for monitoring light at a viewing station in sorting apparatus in order to grade product passing therethrough.

Product can be effectively graded by a colour sorting technique. Various sorting apparatus which grade product according to its ability to reflect light in different wavelength ranges are described in U.S. Pat. Nos. 4,203,522; 4,513,868; 4,630,736; 4,699,273; and 5,538,142, the disclosures of which are incorporated herein by reference. In apparatus disclosed in the '522 and '142 patents for example detectors are responsive to light reflected from a product in different wavelength ranges, and generate signals indicative of different qualities of the product. These signals are compared and analysed, to generate a signal which can activate ejectors to remove the relevant item from the product stream.

In some of the apparatus of the kind described above, the reflected light is monitored by optical systems containing CCD arrays with a plurality of lines of sensing elements. Typically a tri-linear array is used; the three lines of elements view different areas of the product and are filtered to respond to particular wavelength ranges. In order that the colour of an area of the product may accurately be determined it is necessary to compare measurements taken on the three lines of elements at different times. This may be achieved if the speed of the product is constant and is known accurately. However, in practice the speed of the product may vary, the product may move across the stream and it may rotate between sensing positions all of which give rise to difficulties in determining the colour. To avoid the problem it is necessary that the lines of arrays all view the same area of the product simultaneously; i.e. their view is co-incident. Previously this has been addressed by others as detailed in U.S. Pat. No. 5,315,384, by building cameras which split a beam of focussed light from a viewing area into a plurality of paths by use of an arrangement of prisms. The selection of colours in the beams is by filters which are cemented together with the prisms and the arrays. The positioning of the components must be very accurate which makes production of these cameras difficult and expensive, and major colour changes cannot be made to a camera. The introduction of multi-linear CCD arrays offered the possibility of simpler assembly and interchangeability of filters if the problem of the absence of co-incident viewing could be addressed.

SUMMARY OF THE INVENTION

In this invention, light reflected from product at a viewing station in sorting apparatus is monitored by splitting the light received from an area of the product into a plurality of discrete beams, which are then directed onto light sensors, each of which is responsive to light in the visible or infra-red wavelength range required for colour sorting. The beams are directed onto the sensors through a slit which is disposed close to the sensors in such a position that the view of the lines of sensors is co-incident at the viewing station. The light sensors themselves are normally arranged in an array, for example, of charge coupled devices (CCDs), typically a tri-linear array. The beams are filtered into different wavelength ranges by filters positioned in the beams at any position where they follow separate paths. These filters may be changed as required for a particular sorting task without other modifications to the optical assembly being required.

Typically, the light received from a product piece in a viewing station can be split into the plurality of beams by means of a prism section, the split beams then being directed towards the light sensors by a lens. The prism section can consist of two prisms, one on either side of a parallel-sided glass plate disposed on the axis of the lens. The deflection angle of each prism will be very small, for example less than 5° and typically less than 1°, with the result that the split beams remain in close proximity as they pass through the lens Filters are disposed in the path of the beams to restrict the light transmitted in each beam to each sensor to the respective wavelength range, and the filters can be disposed on either side of the prism section, relative to the lens.

In an alternative light splitting mechanism, a variation of a converging lens system is used. Specifically, the portions of a converging lens system between two or more laterally outer sections thereof are reduced, and these outer sections displaced towards the lens axis. The effect is to simultaneously split received light into a plurality of discrete beams in different wavelength ranges by use of filters, and direct the beams onto respective light sensors. The converging lens system may take the form of a simple bi-convex lens, but other suitable assemblies might equally be used. Once again, the light filters can be disposed at any suitable location between the viewing station and the light sensors. This can include coating on the respective active lens surfaces.

Normally, the light emanating from product in the viewing station would be split into beams of light in three discrete wavelength ranges, typically corresponding to those of three specified visible colours, which are known for use in sorting apparatus of this general kind. Alternatively, the wavelength ranges might correspond to those of two specified visible colours, and a third wavelength range in the infra-red. In this configuration, the beams of visible light can be disposed on either side of the beam of infra-red. In one arrangement, the viewing station is illuminated with visible light from the side of which the light sensors are disposed, with light in the third wavelength range being transmitted from the opposite side. The light sensors are thus adapted to monitor reflected light in a visible range, and the light transmitted in the third wavelength range, which may be in the infra-red, being monitored to conduct a "dark" sort and/or monitor the viewing station for the presence or absence of product therefrom, as described in U.S. Pat. No. 5,538,142.

The invention will now be described by way of example and with reference to the accompanying schematic drawings.

DESCRIPTION OF PREFERRED EMBODIMENTS

Figure 1:
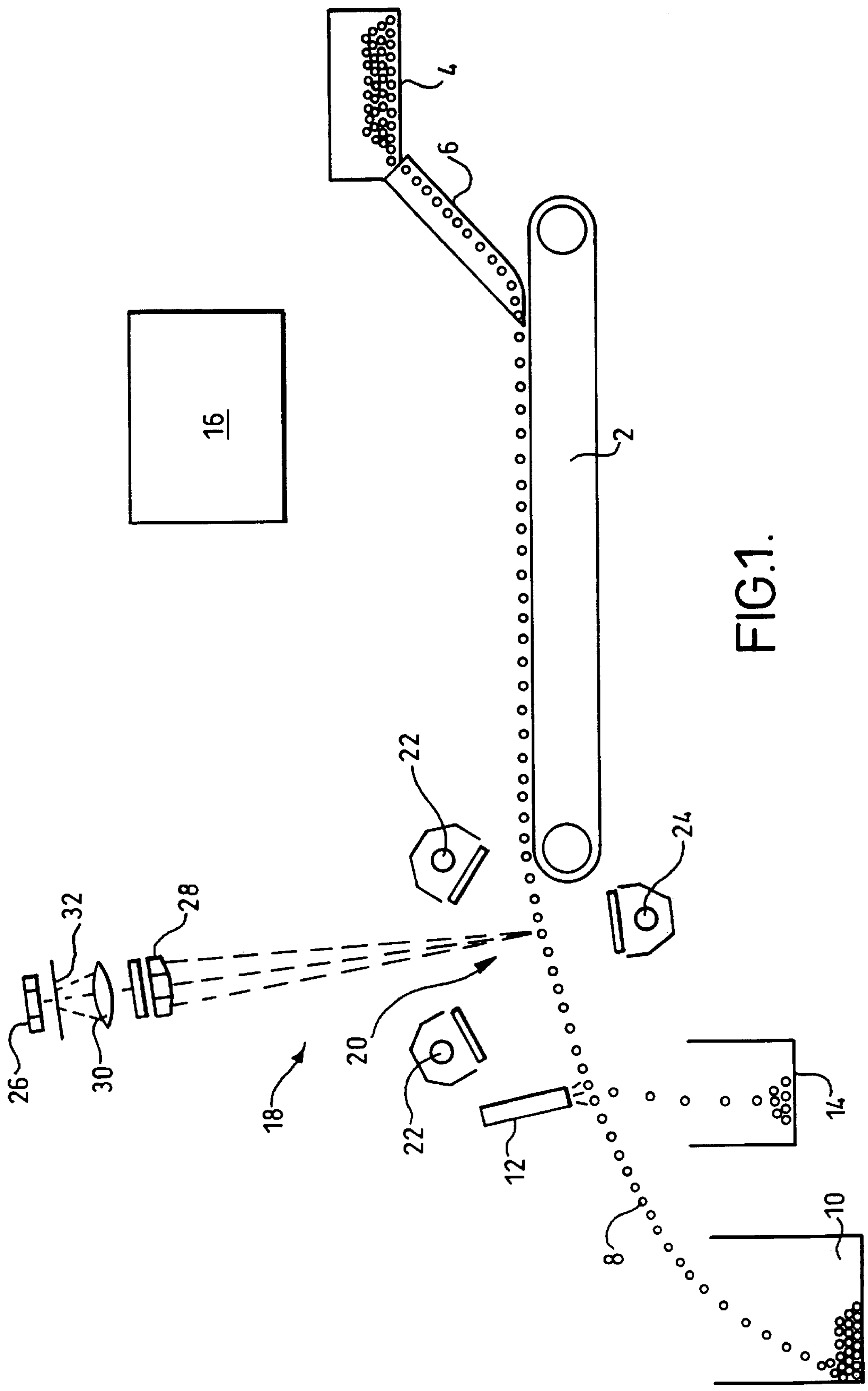
FIG. 1 illustrates diagrammatically the operation of sorting apparatus embodying the invention.

FIG. 1 is an illustration of sorting apparatus including a conveyor 2 to which product is fed from a hopper 4 down a chute 6. The conveyor belt is driven such that its upper level moves from right to left as shown at a speed (for example, 3 meters per second) sufficient to eject material in a product stream 8 to receptacle 10. During its passage from the end of the conveyor 2 to the receptacle 10, the material is kept in the product stream a solely by its own momentum. Ejectors 12 extend over the width of the product stream, and are operable to remove items from specific zones of the product stream 8 by high-pressure air jets, directed towards the reject receptacle 14. Typically, the width of the product stream is around 500 mm, with forty ejectors equally spaced thereover. The ejectors are instructed by a computer or a microprocessor 16, which itself receives input data from the optical scanning system 18, described below.

Reference 20 indicates a viewing station where product in the product stream 8 is scanned. The station is illuminated by visible light on one side from the sources 22, and with radiation from a further source 24 on the other side. The source 24 can be of visible light, but may alternatively be of light in the infra-red range, as will be described below.

Light reflected from product in the product stream as it passes through the viewing station 20 is monitored by an array of sensors 26 in the form of charge-coupled devices (CCDs) sensitive to light in different wavelengths. In its passage to the sensors 26, the light is split into discrete beams at a prism section 28, and the resultant three beams are filtered to restrict the transmitted light to the appropriate wavelength range before being directed by a lens 30 through a slit 32 to the sensors 26. The CCDs are arranged in a tri-linear sensor array which, with the slit 28, extend the viewing to the entire lateral dimension of the product stream.

By monitoring the reflected light in the visible wavelength ranges, and the transmitted light in the third wavelength range, not only can product in the stream be graded, but it is also possible to register the presence or absence of product from the viewing station. Signal generated by the sensors 26 are sent to the computer 16, which in turn instructs the ejectors to remove selected product from the stream. In this respect, the analysis of the light received and the operation of the ejectors is similar to that described in our U.S. Pat. Nos. 4,699,273 and 5,538,142, referred to above.

Figure 2:
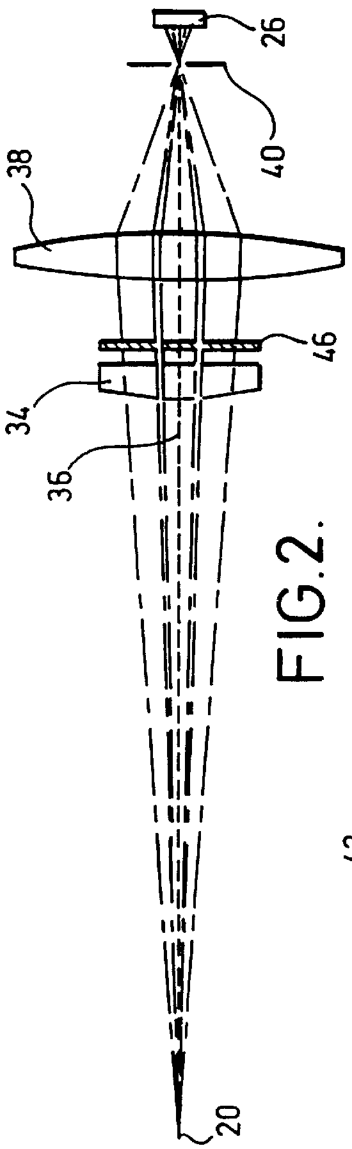
FIG. 2 shows, not to scale, an optical system according to the invention.

FIG. 2 shows in a little more detail the optical scanning system described above with reference to FIG. 1. As can be seen, light emanating from the viewing station 20 passes to a prism section 34 where it is split into three discrete beams. The prism section 34 comprises two glass prisms with a parallel sided glass plate therebetween. The angle of each prism is normally less than 5°, typically less than 1°. The central beam 36 is not substantially deflected, but the beams to either side thereof refract as they pass through the upper and lower prism sections shown before being redirected by the lens 38 onto the array of sensors located behind an aperture plate 40. As indicated above, the drawing is not to scale, and it should be noticed that the ratio of the distance between the product piece in the viewing station and the lens on the one hand to the spacing of the lens from the sensor array on the other, is typically around 20 to 1.

Figure 3:
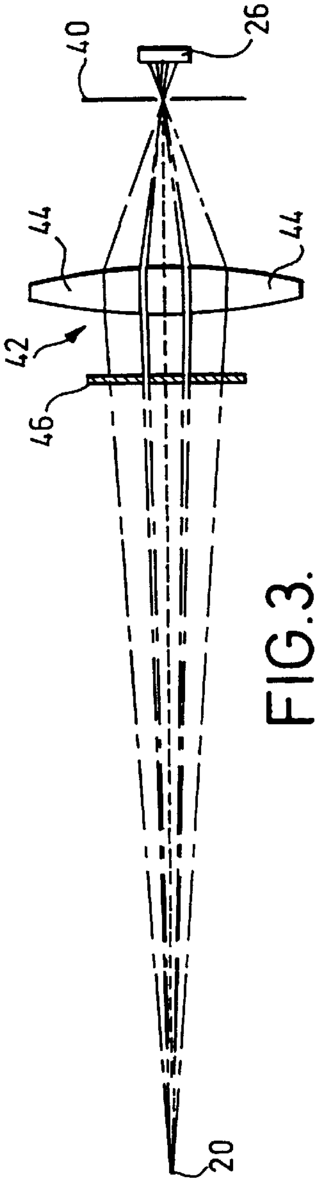
FIG. 3 shows, not to scale, an alternative optical system of the invention.

In the arrangement shown in FIG. 3 the optical system of FIG. 2 has been revised and refined primarily to avoid the use of a separate prism section. This has been accomplished by the use of an adapted converging lens system 42 in which two laterally outer sections 44 of a biconvex or achromatic lens are displaced towards each other and a remaining central section at the lens axis. This results in the creation of what is essentially a prism arrangement, but which also has a focussing effect to redirect the refracted beams to the array of sensors 26. In other respects though, the optical systems of FIGS. 2 and 3 operate in essentially the same way.

Figure 4:
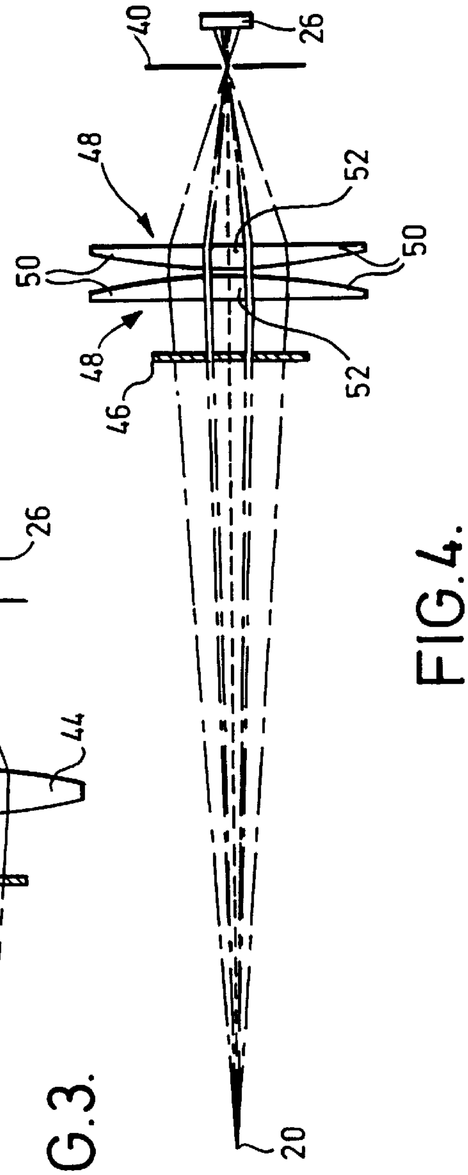
FIG. 4 shows, not to scale, a further alternative optical system of the invention.

FIG. 4 shows an arrangement similar to that of FIG. 3, but with the biconvex or achromatic lens replaced by two plano convex lenses 48. The optical effect of this arrangement is the same as that of the arrangement in FIG. 3. As in the embodiment of FIG. 3, chordal sections of each lens 48 have been removed, and the laterally outer sections 50 (upper and lower as shown) displaced towards the remaining central section 52.

FIGS. 2 to 4 show the disposition of filters 46 in the path of the light in transmission from the viewing station 20. In FIG. 2 the filters are between the prism section 34 and the lens 38. In FIG. 3 they are located in front of the lens system 42. The filters may be disposed between the lens 38, or lens system 42 respectively, and the sensor array, or in the embodiment of FIG. 2, in front of the prism section 34. Alternatively, filter media can be coated onto active surfaces of the lens or lens system to achieve the same effect. The filters determine the wavelength range of light in each beam and where one of the beams is to carry light in the infra-red range, it is preferred that this beam is disposed between the beams of visible light.

The embodiments described above are given by way of example only, and illustrate ways the invention can be put into effect. Variations can be made, and alternative equipment can be used without departing from the spirit and scope of the invention claimed.

We claim:

1. An optical system for monitoring light at a viewing station in sorting apparatus, which system comprises means for illuminating product pieces in the viewing station; a prism section for splitting light received from a said product piece into a plurality of beams; light sensors for receiving light in each of three discrete wavelength ranges; a lens for directing light in each beam on the respective light sensor; filter means for restricting the light in each said beam to one of said wavelength ranges; and a slit disposed between the lens and the light sensors through which the light is directed to the light sensors, said slit limiting the beams to the appropriate sensors.

2. A system according to claim 1 wherein the prism section comprises two glass prisms with a parallel sided glass plate therebetween.

3. A system according to claim 2 wherein the angle of each prism is less than 5°.

4. A system according to claim 1 wherein the prism section comprises two glass prisms that each have an angle less than 5°.

5. An optical system for monitoring light at a viewing station in sorting apparatus, which system comprises means for illuminating product pieces in the viewing station; sensors for receiving light in each of three discrete wavelength ranges; means for splitting light emitted from the viewing station into a plurality of discrete beams corresponding to said wavelength ranges, and for directing said beams onto respective light sensors; filter means for restricting the light in each said beams to one of said wavelength ranges; and a slit between the splitting means and the sensors through which said beams are directed thereto, said slit limiting the beams to the appropriate sensors.

6. A system according to claim 5 wherein the splitting means comprises a central section and two laterally outer sections of a converging lens system displaced towards the lens axis.

7. A system according to claim 6 wherein the converging lens system comprises one of a biconvex lens, a plano convex lens, and an achromatic lens.

8. A system according to claim 5 including filters between the viewing station and the light splitting means to restrict the light transmitted in each beam to each sensor to the respective wavelength range.

9. A system according to either claim 1 or claim 5 wherein the light sensors are assembled in an array.

10. A system according to claim 1 or claim 5 wherein said wavelength ranges correspond to those of three specified visible colours.

11. In sorting apparatus having a viewing station for product to be sorted, an optical system for monitoring light at the viewing station, which system comprises means for illuminating product pieces in the viewing station; a prism section for splitting light received from a said product piece into a plurality of beams, the prism section comprising prisms each having an angle of less than 5°; light sensors for receiving light in each of a plurality of wavelength ranges; a lens for directing light in each beam on the respective light sensor; filter means for restricting the light in each said beam to one of said plurality of wavelength ranges; and a slit disposed between the lens and the light sensors through which the light is directed to the light sensors, said slit limiting the beams to the appropriate sensors.

12. A system according to either of claims 1 or 11 including respective filters to restrict the light transmitted in each beam to each sensor to the respective wavelength range.

13. A system according to claim 12 wherein the filters are disposed between the prism section and the lens.

14. A system according to claim 12 wherein the filters are disposed on the opposite side of the prism section from the lens.

15. A system according to any one of claims 1, 5 or 11, wherein said wavelength ranges correspond to those of two specified visible colours and a third range in the infra-red.

16. A system according to any one of claims 1, 5 or 11, wherein said wavelength ranges correspond to those of two specified visible colours and a third range in the infra-red, and wherein the beam of infra-red light is between the beams of visible light.

17. A system according to any one of claims 1, 5 or 11, wherein the illuminating means comprises means for illuminating product pieces in the viewing station from the side at which the light sensors are disposed; and a radiation source on the opposite side to provide background light.

18. A system according to any one of claims 1, 5 or 11, wherein the light sensors comprise a tri-linear array of sensors.

19. A method of monitoring light emanating from a viewing station in sorting apparatus, comprising splitting the emitted light into three discrete beams; directing the beams to light sensors for receiving light respectively in three wavelength ranges equal to the number of discrete beams, the beams passing through a slit disposed between the light splitter and the sensors.

20. A method according to claim 19 wherein the emanating light is split by passage through a prism section, and the beams are directed onto the sensors by a lens.

21. A method according to claim 19 wherein the emanating light is split and directed onto the sensors by a converging lens system.

22. A method according to claim 21 wherein the lens system comprises two laterally outer sections of one of a biconvex lens, a plano-convex lens and an achromatic lens, displaced towards the lens axis.

23. A method according to claim 19 including the step of filtering the emitted light to restrict the light transmitted to the required wavelength ranges.

24. Sorting apparatus having a sorting section and a delivery system for creating a product stream of product pieces to be sorted at the sorting section, the sorting section including a viewing station and an ejection station, the viewing station comprising means for illuminating pieces in the product stream during passage therethrough; light sensors for receiving light in each of three discrete wavelength ranges; means for splitting light emitted from the viewing station into a plurality of discrete beams corresponding to said wavelength ranges, and for directing said beams onto respective light sensors; and a slit between the splitting means and the sensors through which said beams are directed thereto; and a computer for analysing light received by the sensors to establish whether a product piece in the product stream is acceptable, and for instructing the ejection station to remove from the product stream any product deemed to be selected.

25. An optical system for monitoring light at a viewing station in sorting apparatus, which system comprises means for illuminating product pieces in the viewing station; a prism section for splitting light received from a said product piece into a plurality of beams; light sensors for receiving light in each of a plurality of wavelength ranges; a lens for directing light in each beam on the respective light sensor; filter means for restricting the light in each said beam to one of said plurality of wavelength ranges; and a slit disposed between the lens and the light sensors through which the light is directed to the light sensors, said slit limiting the beams to the appropriate sensors, wherein the illuminating means comprises means for illuminating product pieces in the viewing station from the side at which the light sensors are disposed and a radiation source on the opposite side to provide background light.

26. An optical system for monitoring light at a viewing station in sorting apparatus, which system comprises means for illuminating product pieces in the viewing station; sensors for receiving light in each of a plurality of wavelength ranges; means for splitting light emitted from the viewing station into a plurality of discrete beams corresponding to said plurality of wavelength ranges, and for directing said beams onto respective light sensors; filter means for restricting the light in each said beam to one of said plurality of wavelength ranges; and a slit between the splitting means and the sensors through which said beams are directed thereto, said slit limiting the beams to the appropriate sensors, wherein the illuminating means comprises means for illuminating product pieces in the viewing station from the side at which the light sensors are disposed and a radiation source on the opposite side to provide background light.

27. In sorting apparatus having a viewing station for product to be sorted, a method of monitoring light emanating from the viewing station comprising splitting the emitted light into a plurality of discrete beams; directing the beams to light sensors for receiving light respectively in a number of wavelength ranges equal to the number of discrete beams, the beams passing through a slit disposed between the light splitter and the sensors, and wherein product pieces in the viewing station are illuminated from the side at which the light sensors are disposed, and background light is provided by a radiation source on the opposite side.

* * * * *